US010736455B2

(12) United States Patent
Berendsen (10) Patent No.: US 10,736,455 B2
(45) Date of Patent: Aug. 11, 2020

(54) PRESSING BODY AND APPARATUS FOR OBTAINING FRUIT JUICE AND/OR FRUIT PULP FROM CITRUS FRUIT

(71) Applicant: Espressions B.V., Eindhoven (NL)

(72) Inventor: Marcus Johannes Antonius Berendsen, TV Oss (NL)

(73) Assignee: ESPRESSIONS B.V. (NL)

( * ) Notice: Subject to any disclaimer, the term of this patent is extended or adjusted under 35 U.S.C. 154(b) by 208 days.

(21) Appl. No.: 16/003,714

(22) Filed: Jun. 8, 2018

(65) Prior Publication Data

US 2019/0014939 A1 Jan. 17, 2019

(30) Foreign Application Priority Data

Jul. 11, 2017 (EP) .................................... 17180718

(51) Int. Cl.
*A47J 19/02* (2006.01)
(52) U.S. Cl.
CPC ........... *A47J 19/025* (2013.01); *A47J 19/023* (2018.08); *A47J 19/027* (2013.01)
(58) Field of Classification Search
CPC ...... A47J 19/022; A47J 19/023; A47J 19/025; A47J 19/027
USPC ........................................................ 100/213
See application file for complete search history.

(56) References Cited

U.S. PATENT DOCUMENTS

| 3,122,185 | A | | 2/1964 | Roberts | |
|---|---|---|---|---|---|
| 5,193,447 | A | * | 3/1993 | Lucas | .................... A47J 19/023 99/508 |
| 2005/0028682 | A1 | * | 2/2005 | Steffl | ..................... A47J 19/023 99/501 |

(Continued)

FOREIGN PATENT DOCUMENTS

| CN | 104955362 | | 9/2015 | |
|---|---|---|---|---|
| GB | 2275415 A | * | 8/1994 | ............ A47J 19/023 |

(Continued)

OTHER PUBLICATIONS

International Search Report and Written Opinion of corresponding PCT Application No. PCT/NL2017958, dated Sep. 25, 2017.

*Primary Examiner* — Jimmy T Nguyen
(74) *Attorney, Agent, or Firm* — Emerson, Thomson & Bennett, LLC; Roger D. Emerson; Peter R. Detorre (57) ABSTRACT

An apparatus for obtaining fruit juice and/or fruit pulp from citrus fruit is provided. The apparatus includes a drive mechanism provided with a drive shaft and a pressing body provided on the drive shaft, said pressing body having a dome-shaped pressing surface having a top and a base, as well as ribs extending between the top and the base, wherein a cross section of the pressing body at right angles to the central axis of the pressing body has a substantially zigzag-shaped periphery, wherein each rib is provided with a flank which slopes steeply from the circumscribed circle of the periphery and a flank which slopes gradually from the circumscribed circle of the periphery, wherein the angle which is included between the circumscribed circle and the (Continued)

steeply sloping flank is greater than the angle included by the circumscribed circle and the gradually sloping flank, and wherein the steeply sloping flank and the gradually sloping flank of adjoining ribs along the periphery face each other and wherein the top of the pressing surface is provided with a recess.

14 Claims, 6 Drawing Sheets

(56) References Cited

U.S. PATENT DOCUMENTS

| | | | |
|---|---|---|---|
| 2005/0284309 A1* | 12/2005 | de Groote | A47J 17/18 99/508 |
| 2007/0125244 A1* | 6/2007 | Hensel | A47J 19/025 99/501 |
| 2016/0206130 A1 | 7/2016 | Takabu | |

FOREIGN PATENT DOCUMENTS

| | | |
|---|---|---|
| JP | S5576729 | 11/1953 |
| JP | S51119160 | 9/1976 |
| JP | S564519 | 1/1981 |
| SE | 143988 | 2/1954 |
| WO | 2005041732 | 5/2005 |

* cited by examiner

PRESSING BODY AND APPARATUS FOR OBTAINING FRUIT JUICE AND/OR FRUIT PULP FROM CITRUS FRUIT

The invention relates to a pressing body for obtaining fruit juice and/or fruit pulp from citrus fruit, comprising a dome-shaped pressing surface comprising a top and a base, as well as ribs extending between the top and the base. The invention also relates to an apparatus for obtaining fruit juice and/or fruit pulp from citrus fruit, and in particular a citrus juicer provided with such a pressing body.

A citrus juicer provided with such a pressing body is already known from GB 2 423 465 A. The ribs of this known pressing body are narrow projections having a mirror-symmetrical cross section. By pressing the citrus fruit harder against the pressing body during squeezing, not only will juice be squeezed from the citrus fruit, but fruit pulp as well. If no fruit pulp is desired in the juice, the citrus fruit should not be pressed too hard against the pressing body, as a result of which not all the juice is squeezed from the citrus fruit. In addition, there is still the risk in this case of fruit pulp being carried along during squeezing and ending up in the juice. Alternatively, a strainer may be used which will have to be cleaned regularly.

It is an object of the invention to provide a pressing body of the type mentioned in the preamble by means of which only the juice or the juice and the fruit pulp can be squeezed from the citrus fruit, as desired, without the citrus juicer having to be provided with a strainer for this purpose.

To this end, the present invention provides a pressing body, comprising a dome-shaped pressing surface comprising a top and a base, as well as ribs extending between the top and the base, wherein a cross section of the pressing body at right angles to the central axis of the pressing body has a substantially zigzag-shaped periphery, wherein each rib is provided with a flank which slopes steeply from the circumscribed circle of the periphery and a flank which slopes gradually from the circumscribed circle of the periphery, wherein the angle which is included between the circumscribed circle and the steeply sloping flank is greater than the angle included by the circumscribed circle and the gradually sloping flank, and wherein the steeply sloping flank and the gradually sloping flank of adjoining ribs along the periphery face each other. The pressing body may comprise the dome-shaped pressing surface, that is to say form part thereof, and the body comprises further parts or may consist thereof.

In other words, the invention comprises a pressing body for a citrus juicer, which pressing body is dome-shaped and is provided with a top as well as a bottom edge, and which pressing body is furthermore provided with teeth which extend between the top and the bottom edge of the pressing body, characterized in that a cross section of the pressing body at right angles to the central axis of the pressing body has a zigzag-shaped periphery, wherein each tooth is provided with a steeply ascending flank as well as a, from the top of the steeply ascending flank to the base of a neighbouring steeply ascending flank, gradually sloping flank, wherein the top of the steeply ascending flank forms a scraping edge and the gradually sloping flank forms a pressing area.

By rotating the pressing body about its central axis in the direction in which the steeply sloping flanks are situated at the front, viewed in the direction of movement, the ribs will function as teeth which open the skin surrounding the segments of a citrus fruit, as a result of which the fruit pulp fibres are included. In this case, the steeply sloping flanks form scraping areas moving along the skin of the citrus fruit.

By rotating the pressing body about its central axis in the direction in which the gradually sloping flanks are situated at the front, viewed in the direction of movement, the ribs will function as pressing elements which push the fruit pulp against the skin and at the same time squeeze the juice out of the fruit pulp without removing the fruit pulp from the skin. In this case, the gradually sloping flanks form pressing areas which move along the skin of the citrus fruit. Depending on the direction of rotation of the pressing body, a juice either rich in fibre or poor in fibre is obtained.

In this case, the term zigzag-shaped should be understood to refer not only to a zigzag shape with straight lines/faces, but the steeply sloping flank and the gradually sloping flank may also be curved.

In an advantageous embodiment of the pressing body according to the invention, the angle included between the circumscribed circle and the steeply sloping flank is 50-90 degrees. Furthermore, in an advantageous embodiment of the pressing body according to the invention, the angle included between the circumscribed circle and the gradually sloping flank may be 0-30 degrees. Depending on the preference with regard to the composition of the fruit juice to be produced in terms of the ratio between juice and fibres, the abovementioned angles may be adjusted.

In order to increase the difference in composition of the fruit juice to be produced between the different directions of rotation of the pressing body, the angle included between the circumscribed circle and the steeply sloping flank has to be increased and the angle included between the circumscribed circle and the gradually sloping flank has to be reduced.

In another advantageous embodiment of the pressing body according to the invention, the top of the pressing surface is provided with a recess. This recess is configured for accommodating the core of a citrus fruit placed on the pressing body, as a result of which the often bitter core of the fruit pulp is not removed from the skin and does not end up with the fruit pulp or in the juice.

It is also possible for a recess at the location of the pointed end to be provided advantageously in a pressing body which has a different shape to that described above. Such a recess may be provided in any conceivable pressing body for an apparatus to obtain juice from fruit.

It is advantageous if the recess extends at least 8 mm in the direction of the central axis of the pressing body, as a result of which substantially the entire bitter core of the citrus fruit can be accommodated in the recess. For the same reason, it is advantageous if the recess has a diameter of at least 4 mm. Depending on the size of the citrus fruit to be squeezed, the recess may extend further in the direction of the central axis of the pressing body and the diameter of the recess may be dimensioned to be larger.

It is also advantageous if the recess is formed by a hollow space which is completely delimited by a wall of the pressing body. The hollow space offers a passage for the bitter core of the citrus fruit from the top of the pressing body and the dome-shaped pressing surface. By surrounding the other sides of the hollow space by means of the wall of the pressing body and thus completely delimiting it, juice, fibres and fruit pulp originating from the core are retained in the hollow space and the rest of the apparatus will not become soiled by said juice, fibres and fruit pulp.

In yet another advantageous embodiment of the pressing body according to the invention, the inscribed circle and the circumscribed circle of the substantially zigzag-shaped periphery are at a distance apart, which distance is 2-15 mm.

The intermediate distance between the inscribed circle and the circumscribed circle is determined by the degree to which the ribs protrude. Tests have shown that such a distance is desirable in order to achieve maximum squeezing efficiency.

In order to increase the squeezing efficiency further, it is advantageous if the ribs extend at least up to a distance from the top and the base of the pressing surface, which distance is smaller than or equal to a quarter of the distance between the top and the base of the pressing surface. More preferably, the ribs extend over the pressing surface substantially along the entire length between the top and the base, as a result of which the pressing or scraping/cutting action of the ribs takes place across virtually the entire inside of the skin of the citrus fruit.

In a further advantageous embodiment of the pressing body according to the invention, the gradually sloping flanks of the ribs are provided with a groove which extends in the longitudinal direction of the ribs. These grooves ensure that the juice and fruit pulp can be removed during squeezing in an optimum manner in the direction of a collecting bowl or receptacle intended for this purpose.

In order to improve the stiffness and strength of the pressing body, it is also possible for the base of the pressing surface to be formed by a flange which extends at right angles to the pressing surface in a direction facing away from the central axis of the pressing body. Such a flange may also serve as a stop for one half of a citrus fruit which has been placed on the pressing body in order to prevent the citrus fruit from being pushed too far over the pressing body, which would create a risk of the the skin of the citrus fruit splitting.

Preferably, the pressing body is hollow, which results in a saving in material.

The invention also relates to an apparatus for obtaining fruit juice and/or fruit pulp from citrus fruit, in particular a citrus juicer, comprising a drive mechanism provided with a drive shaft and a pressing body according to any of the preceding claims provided on the drive shaft. In an advantageous embodiment of the apparatus according to the invention, the drive mechanism is configured to allow the drive shaft to rotate in one of two mutually opposite directions, as desired. As a result, a pressing body according to the invention driven by the drive shaft can rotate about its central axis in a clockwise or counterclockwise direction, as desired. In one case, the citrus juicer will squeeze juice from the citrus fruit in an optimum manner while no fruit pulp is being carried along, or only to a limited degree. In the other case, the citrus juicer will squeeze juice and fruit pulp from the citrus fruit in an optimum manner, as a result of which a fibre-rich juice is obtained. Depending on the orientation of the ribs provided on the pressing surface of the pressing body, the abovementioned effects will occur upon rotation of the pressing body in a clockwise or counterclockwise direction, respectively, and vice versa.

The invention will now be explained in more detail below by means of non-limiting exemplary embodiments of the pressing body and apparatus for obtaining fruit juice and/or fruit pulp from citrus fruit according to the invention illustrated in the drawings, in which.

Figure 1:
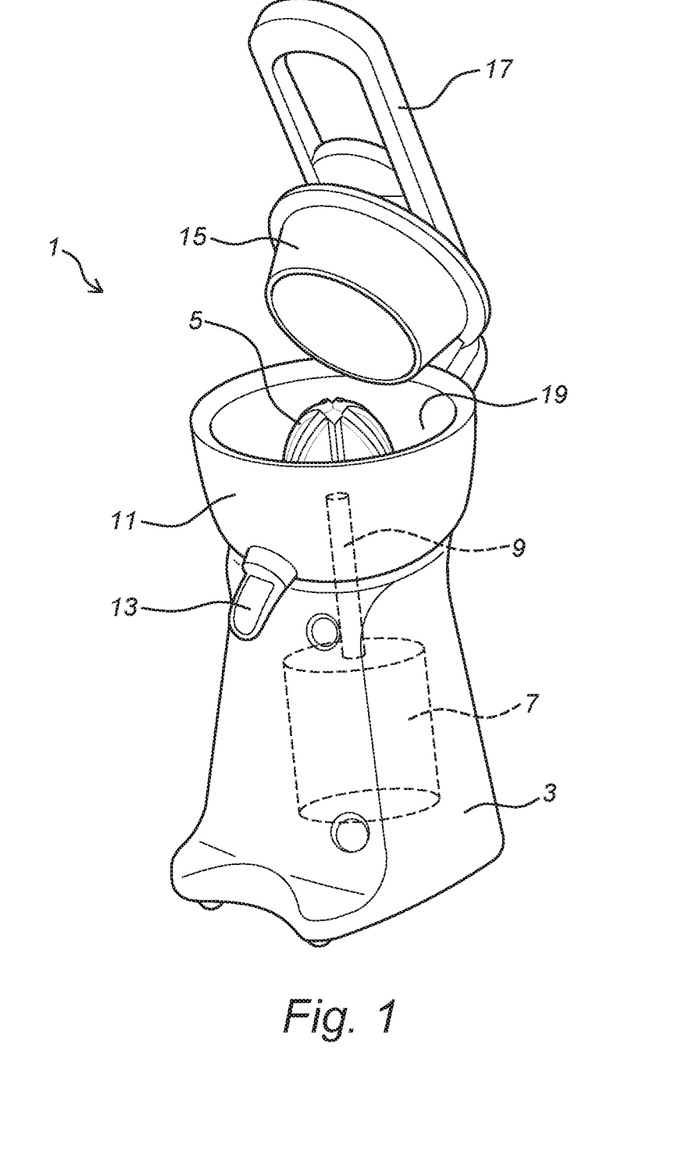
FIG. 1 shows a perspective view of an embodiment of a citrus juicer according to the invention.
Figure 2:
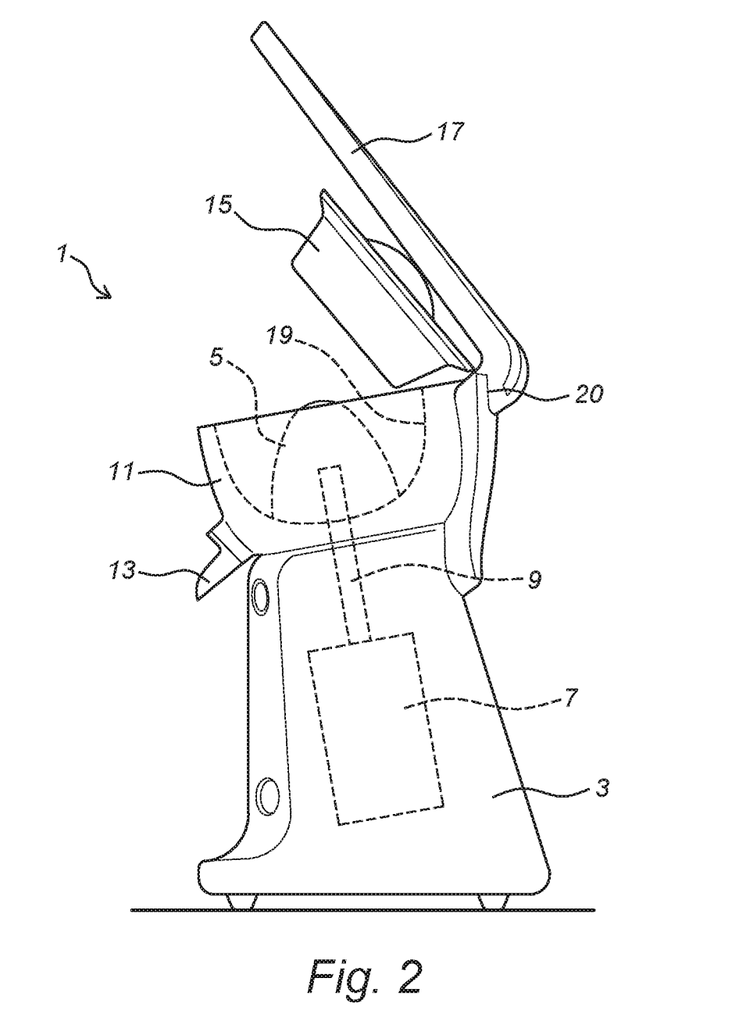
FIG. 2 shows a side view of the citrus juicer illustrated in FIG. 1.
Figure 3:
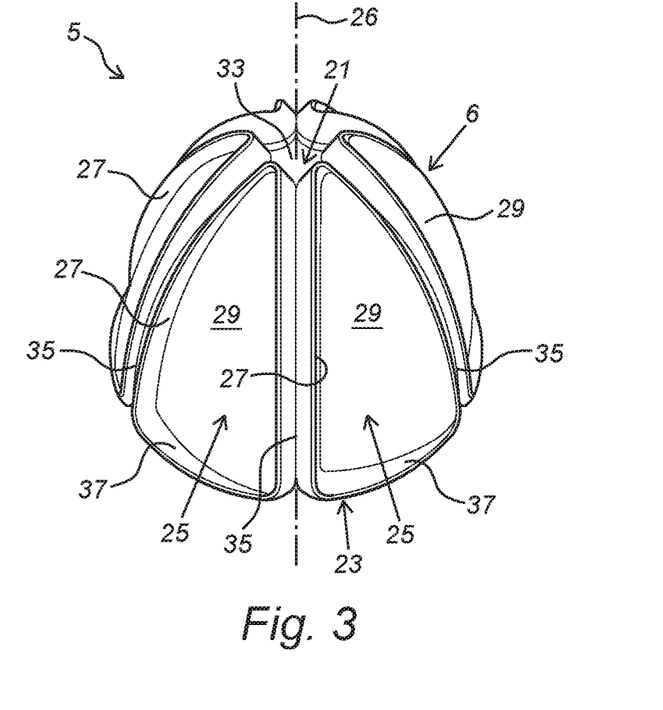
FIG. 3 shows a perspective view of a first embodiment of a pressing body according to the invention.
Figure 4:
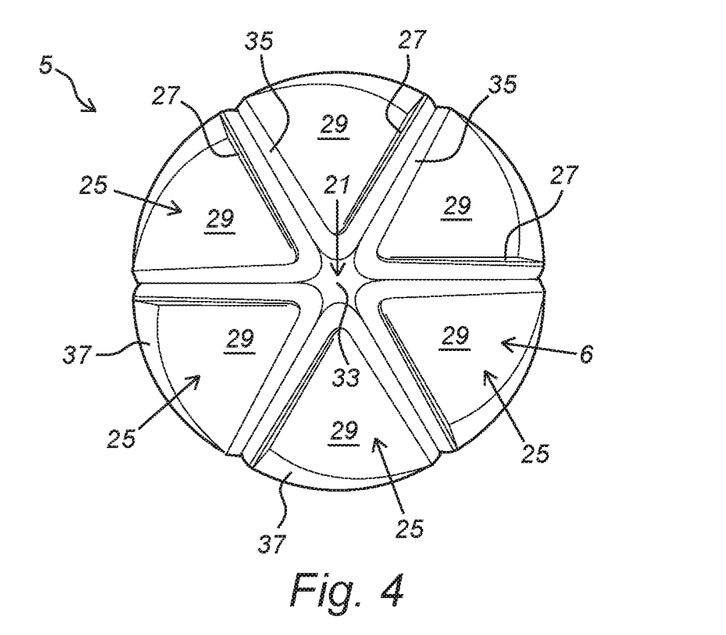
FIG. 4 shows a top view of the pressing body illustrated in FIG. 3.

FIGS. 1 and 2 show an embodiment of a citrus juicer according to the invention in perspective and side view, respectively. The citrus juicer 1 has a housing 3 containing a drive mechanism provided with a drive shaft. A pressing body 5 is present on the drive shaft. The drive mechanism is formed by an electric motor 7 (indicated by dashed lines) whose rotor shaft 9 forms the drive shaft or in which the rotor shaft is connected to the drive shaft via a transmission. Due to the fact that the rotor shaft can rotate in two directions or that the transmission can reverse the direction of rotation, the electric motor can drive the drive shaft and thus the pressing body in two opposite directions.

The pressing body 5 is situated in a receiving bowl 11 for juice and fruit pulp which is provided with a outlet opening 13. The receiving bowl contains a centrifuge 19. The citrus juicer 1 furthermore has a pressure-exerting cover 15 for pressing a citrus fruit onto the pressing body during squeezing. The pressure-exerting cover is connected to a pressure-exerting arm 17 which is connected to the housing at one end by means of a hinge 20. When the pressure-exerting cover is closed, the pressure-exerting cover 15 or the pressure-exerting arm 17 connected to the pressure-exerting cover preferably rests on the receiving bowl 11 which in this case serves as a stop to ensure a constant distance between the pressure-exerting cover 15 and the pressing body 5. It is also possible for the stop to be provided in the hinge 20 or at another location on the citrus juicer 1.

FIGS. 3, 4, 5 and 6 show a first embodiment of the pressing body of the citrus juicer in perspective and top view, cross section and side view, respectively. The outside of the pressing body 5 is provided with a pressing surface 6, which pressing surface defines a top 21 and a base 23 which also form the delimitation of the pressing body 5. In the embodiment illustrated here, the pressing body has six ribs 25 which extend between the top 21 and the base 23 of the pressing surface 6.

Figure 5:
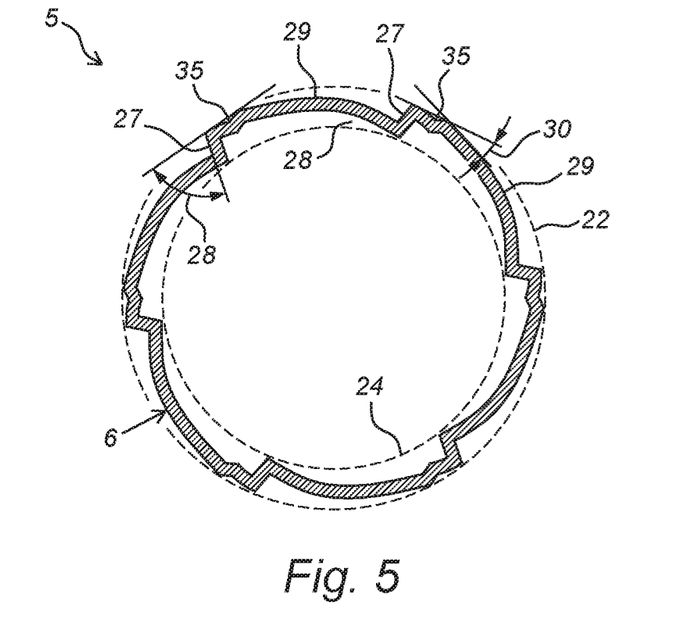
FIG. 5 shows a cross section of the pressing body illustrated in FIG. 3.
Figure 6:
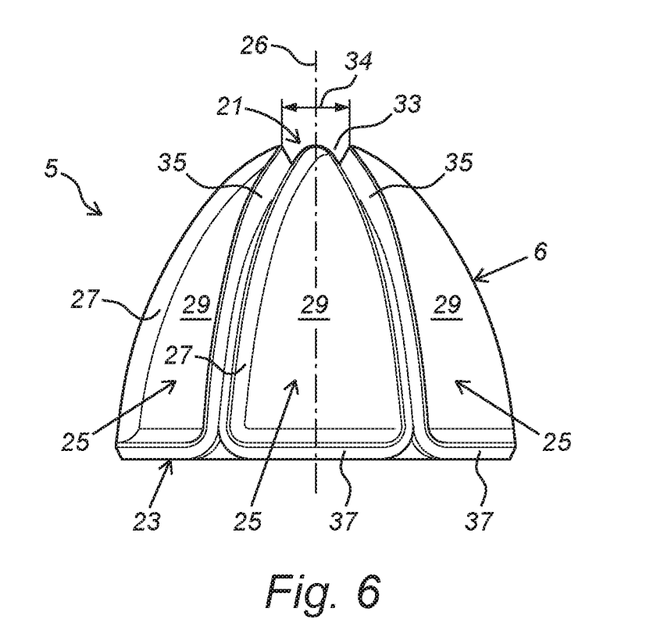
FIG. 6 shows a side view of the pressing body illustrated in FIG. 3.

In a cross section at right angles to the central axis 26 of the pressing body, the pressing surface 6 has a zigzag-shaped profile, see FIG. 5. The ribs 25 are enclosed by the inscribed circle 24 and the circumscribed circle 22 of the substantially zigzag-shaped periphery, with the ribs 25 being dimensioned such that said circles 22, 24 are a distance of 2-15 mm apart.

Each rib 25 has a flank 27 which slopes steeply from the circumscribed circle of the periphery 22 (see FIG. 5) and a flank 29 which slopes gradually from the circumscribed circle of the periphery 22. In this case, the angle 28 included between the circumscribed circle 22 and the steeply sloping flank 27 is greater than the angle 30 included by the circumscribed circle 22 and the gradually sloping flank 29. Preferably, the angle 28 included between the circumscribed circle 22 and the steeply sloping flank is 50-90 degrees. However, it is also conceivable for an angle greater than 90 to be chosen, in order to greatly increase the scraping action of the ribs 25. The angle 30 included between the circumscribed circle 22 and the gradually sloping flank is preferably 0-30 degrees.

Depending on the chosen direction of rotation, the steeply sloping flanks 27 or the gradually sloping flanks 29 will be situated at the front, viewed in the direction of movement, with the steeply sloping flanks 27 or the gradually sloping flanks 29 serving as scraping areas and pressing areas, respectively. It should be noted that, to this end, the steeply sloping flank 27 and the gradually sloping flank 30 of ribs adjoining along the periphery are turned towards each other.

The pressing body 5 is provided with a recess 33 at the location of the top 21, which recess preferably has a diameter 34 of at least 4 mm and extends at least 8 mm in the direction of the central axis of the pressing body.

The gradually sloping flanks 29 of the ribs 25 are each provided with a groove 35 extending in the longitudinal direction of the ribs 25. These grooves preferably extend from the top 21 or the recess 33 up to the base 23 of the pressing body. The base 23 of the illustrated pressing body 5 is formed by a flange 37 which extends at right angles to the pressing surface 6 in a direction facing away from the central axis 26 of the pressing body 5 and which is also situated between the ribs. Viewed in the side view of the pressing body (see FIG. 6), the flange 37 has a rounded shape on both sides of each groove and the flange 37 seamlessly merges into the delimiting sides of the groove 35. As a result, extracted juice and/or fruit pulp can readily flow away via the groove 35 and the flange 37 in the direction of a receiving bowl.

Figure 7:
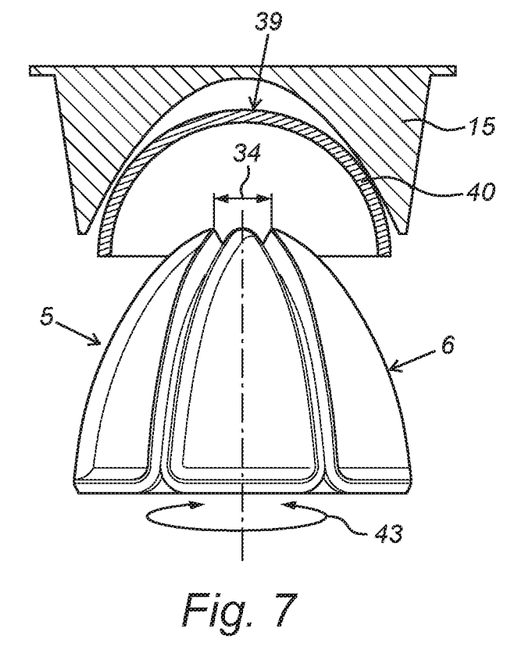
FIG. 7 shows a side view of the pressing body illustrated in FIG. 3 during the squeezing operation of half a citrus fruit at the start of squeezing.
Figure 8:
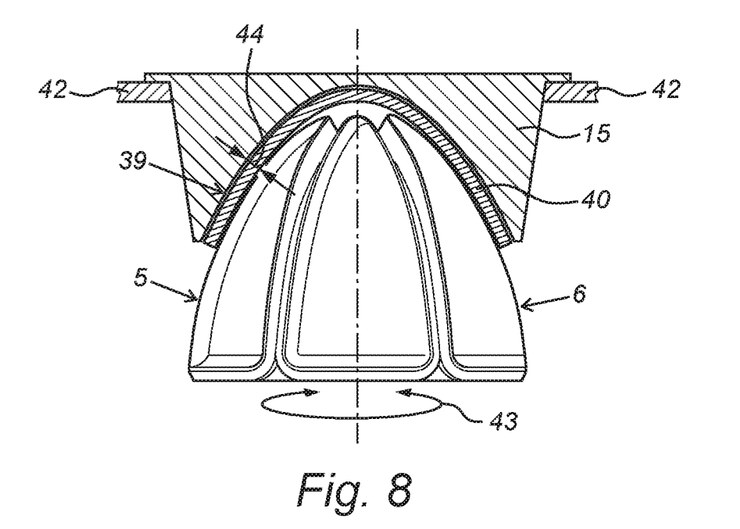
FIG. 8 shows a side view of the pressing body illustrated in FIG. 3 during the squeezing operation of half a citrus fruit at the end of squeezing.

FIGS. 7 and 8 show the pressing body 5 illustrated in FIGS. 3-6 during the squeezing operation of half a citrus fruit 39 at the start and at the end of the squeezing process, respectively. The citrus fruit 39 is supported in a stable manner by the six teeth and (the inside of) the skin 40 thereof can be pressed completely against the pressing surface of the pressing body 5. The pressing body 5 can be rotated in two mutually opposite directions 43, in which, in one direction, mainly juice is squeezed from the citrus fruit and, in the other direction, fruit pulp is additionally scraped from the skin 40.

FIGS. 7 and 8 also show the pressure-exerting cover 15, which pressure-exerting cover follows the contour of the pressing surface 6. The pressure-exerting cover is configured to rest on a stop 42 provided on the citrus juicer, by means of which a constant distance 44 is ensured between the pressure-exerting cover 15 and the pressing surface 6 in the closed position of the pressure-exerting cover 15. This distance 44 is preferably substantially equal to the thickness of the skin 40 of the citrus fruit 39. In this case, a part of the housing of the citrus juicer may serve as the stop 42.

Figure 9:
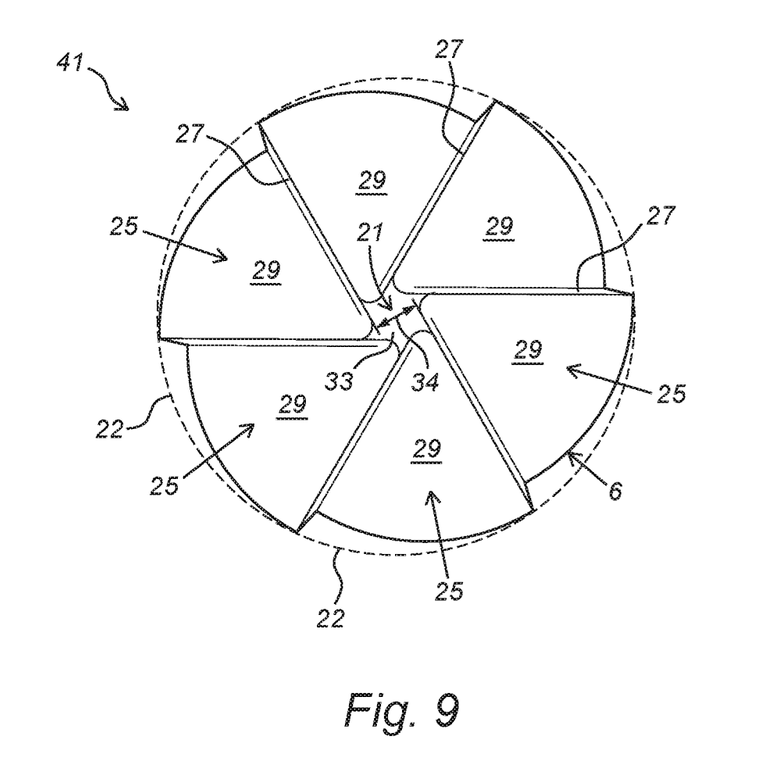
FIG. 9 shows a top view of a second embodiment of a pressing body according to the invention.

FIG. 9 shows a second embodiment of the pressing body according to the invention in top view. In contrast to the above-described pressing body, this pressing body 41 is not provided with grooves and has no flange. The parts identical to those of the above-described pressing body are denoted by the same reference numerals.

Although the invention has been explained above by means of the drawings, it should be noted that the invention is by no means limited to the embodiment illustrated in the drawings. The invention also includes all embodiments which differ from the embodiment shown in the drawings, but fall within the scope of the invention as defined by the claims.

The invention claimed is:

1. An apparatus for obtaining fruit juice and/or fruit pulp from citrus fruit comprising a drive mechanism provided with a drive shaft and a pressing body provided on the drive shaft, said pressing body comprising a dome-shaped pressing surface comprising a top and a base, as well as ribs extending between the top and the base, wherein a cross section of the pressing body at right angles to a central axis of the pressing body has a zigzag-shaped periphery, wherein each rib is provided with a flank which slopes steeply from a circumscribed circle of the periphery and a circular-shaped flank which slopes gradually from the circumscribed circle of the periphery, wherein a first angle which is included between the circumscribed circle and the steeply sloping flank is greater than a second angle included by the circumscribed circle and the gradually sloping flank, wherein the steeply sloping flank and the gradually sloping flank of adjoining ribs along the periphery face each other, and wherein the top of the pressing surface is provided with a recess.

2. The apparatus according to claim 1, wherein the first angle included between the circumscribed circle and the steeply sloping flank is 50-90 degrees.

3. The apparatus according to claim 1, wherein the second angle included between the circumscribed circle and the gradually sloping flank is greater than 0 to 30 degrees.

4. The apparatus according to claim 1, wherein the recess extends at least 8 mm in the direction of the central axis of the pressing body.

5. The apparatus according to claim 1, wherein the recess has a diameter of at least 4 mm.

6. The apparatus according to claim 1, wherein the recess is formed by a hollow space which is completely delimited by a wall of the pressing body.

7. The apparatus according to claim 1 further comprising an inscribed circle of the zigzag-shaped periphery, wherein the inscribed circle and the circumscribed circle of the zigzag-shaped periphery are at a distance apart, which distance is 2-15 mm.

8. The apparatus according to claim 1, wherein the ribs extend at least up to a distance smaller than or equal to a quarter of the distance between the top and the base of the pressing surface.

9. The apparatus according to claim 8, wherein the ribs extend over the pressing surface along the entire length between the top and the base of the pressing surface.

10. The apparatus according to claim 1, wherein the gradually sloping flanks of the ribs are provided with a groove which extends in a longitudinal direction of the ribs.

11. The apparatus according to claim 1, wherein the base of the pressing surface is formed by a flange which extends at right angles to the pressing surface in a direction facing away from the central axis of the pressing body.

12. The apparatus according to claim 1, wherein the pressing body is hollow.

13. The apparatus according to claim 1, wherein the drive mechanism is configured to allow the drive shaft to rotate in one of two mutually opposite directions, as desired.

14. The apparatus according to claim 1, wherein the apparatus is provided with a pressure-exerting cover which follows a contour of the circumscribed circle of the pressing body, which pressure-exerting cover is configured to rest on a stop which is also provided on the citrus juicer in order to ensure a constant distance between the pressure-exerting cover and the circumscribed circle of the pressing body.

* * * * *